United States Patent Office 3,531,166
Patented Sept. 29, 1970

3,531,166
AXLE-BOX FOR THE AXLE OF PAIR OF WHEELS OF ROLLING STOCK
Vitaly Vasilievich Dudin, Novo-Basmannaya ul. 4/6, kv. 229, and Konstantin Vasilievich Latyshev, Bolshoi Sukharevsky per. 15, kv. 29, both of Moscow, U.S.S.R.
Filed Sept. 6, 1968, Ser. No. 757,812
Int. Cl. B61f *17/02*
U.S. Cl. 308—83     3 Claims

ABSTRACT OF THE DISCLOSURE

An axle-box for supporting a wheel-carrying axle, is provided with a fixed cylindrical bearing in which is rotatably journaled an end portion of an axle. Fixed on the axle is a cylindrical rest bushing for rotating with the axle internally of the bearing. Thrust rings are fixed at the opposite ends of the bearing for constraining the rest bushing therebetween. An oil tank is provided in the axle-box for lubricating the system and a collar cooperating with a corrugated sealing sleeve is fixed on the axle for preventing oil leakage from the axle-box.

---

The present invention relates to railroad transportation and, more particularly, to axle-boxes for the axle of a pair of wheels of rolling stock.

Known in the art are axle-boxes for the axle of a pair of wheels of rolling stock, whose bodies house a sliding friction bearing supported by a rest bushing rigidly set on an axle journal, and sealings. In its lower portion, the sliding contact bearing has a hole for bringing oil to the friction surfaces, in which the top portion of the cushion is arranged. Lubrication of the friction surfaces is effected due to capillary properties of the cushion.

A disadvantage of said axle-box is that it does not always ensure the operation of the bearing in the conditions of liquid friction at high loads and motion speeds.

It is an object of the present invention to provide an axle-box whose bearing is capable of stable operation in conditions of liquid friction, ensuring its high reliability and prolonged service life.

According to this and other objects, an axle-box is proposed for the axle of a pair of wheels in rolling stock, whose body houses: a sliding friction bearing, mounted on a rest bushing rigidly set on the journal axle, and having in its lower portion a hole for bringing oil to the friction surfaces, and sealings. According to the invention, the bearing butts carry thrust rings embracing the butts of the rest bushing; the sealing from the wheel side is made so as to ensure an oil level in the axle-box body when the lower portion of the bearing, having the hole, and a portion of the rest bushing are immersed in the oil.

It is feasible for the thrust rings from the side adjacent to the rest bushing have arched grooves communicating ranged in the collar cannelure form a labyrinth by its the bearing, the depth of said arched grooves being largest in the place of their linkage with the radial grooves and smallest at their ends.

It is also feasible to make the sealing from the wheel side as a corrugated sleeve whose working edges arranged in the collar cannelure form a labyrinth by its walls, and to provide said cannelure with a duct for bringing oil to the working edges of the sleeve.

The axle-box of the present invention permits the operation of the bearing in the conditions of liquid friction, which ensures high reliability and long service life of the bearing at practically any speed and load conditions.

The invention will be more apparent from the description of an exemplary embodiment thereof, reference being made to the appended drawings, wherein.

Figure 1:
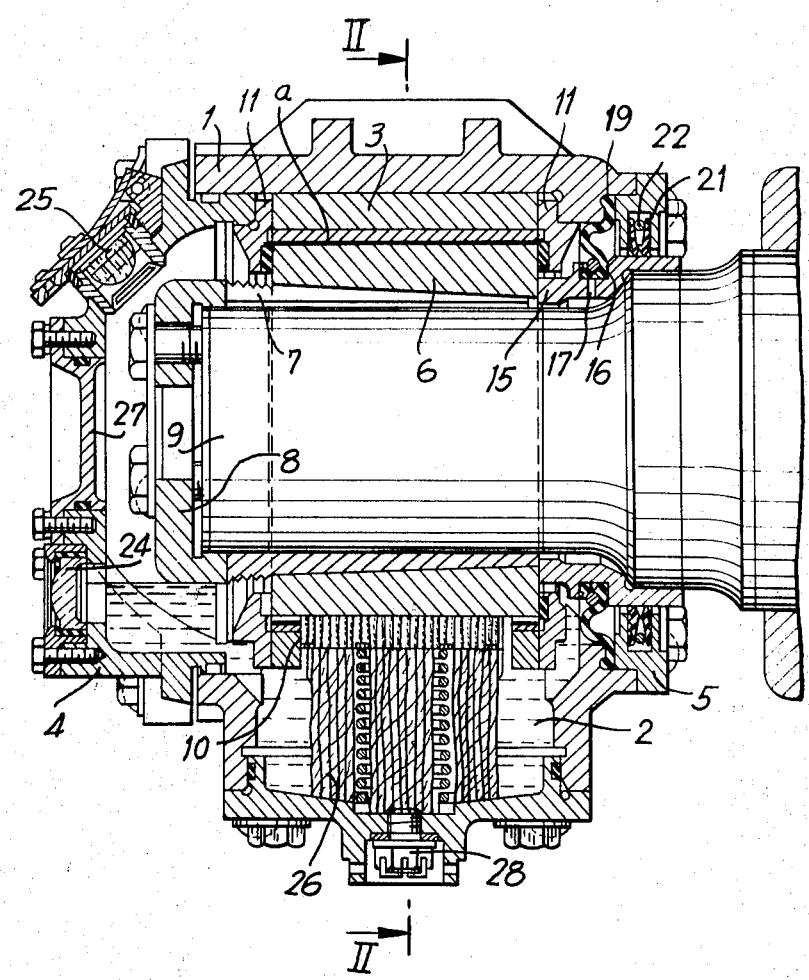
FIG. 1 shows a longitudinal section of the axle-box for the axle of a pair of wheels for rolling stock, according to the invention.

A body 1 (FIG. 1) of the axle-box is made as a box whose lower portion is a tank 2 for oil, while the upper cylindrical portion houses a sliding friction bearing 3.

The axle-box body 1 is closed by front cover 4 and rear cover 5.

The bearing 3 made as a cylindrical bushing is supported by a rest bushing 6. The latter is rigidly set on a journal axle 9 of the pair of wheels by means of a slip bushing 7 and a washer 8.

In the lower portion of the bearing 3, there is a hole 10 for channeling oil to the friction surfaces.

Thrust rings 11 are secured on the butts of the bearing 3, said rings forming the bearing fillets against which the butts of the rest bushing 6 rest.

The working surfaces of the bearing 3 and the thrust rings 11 are coated with an antifriction material *a*.

Figure 2:
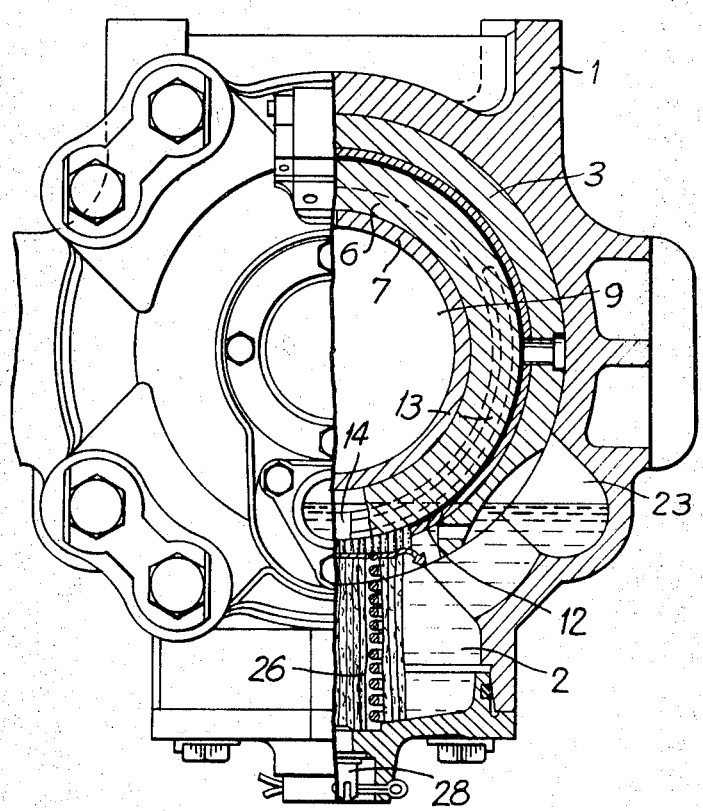
FIG. 2 shows a front view with a partial section taken on line II—II of FIG. 1.

In order to bring oil to the loaded cylindrical surface of the bearing 3, there is a gap 12 (FIG. 2) in its lower portion, while arched grooves 13 communicating with radial grooves 14 leading to the cylindrical surface of the bearing 3 are provided in the thrust rings 11 from the side adjacent to the rest bushing 6 so as to bring oil to the butts of the bearing 3 and to the butts of the rest bushing 6.

The arched grooves 13 are the deepest in the place of their linkage with the radial grooves 14 and their depth is the smallest at their ends.

Figure 3:
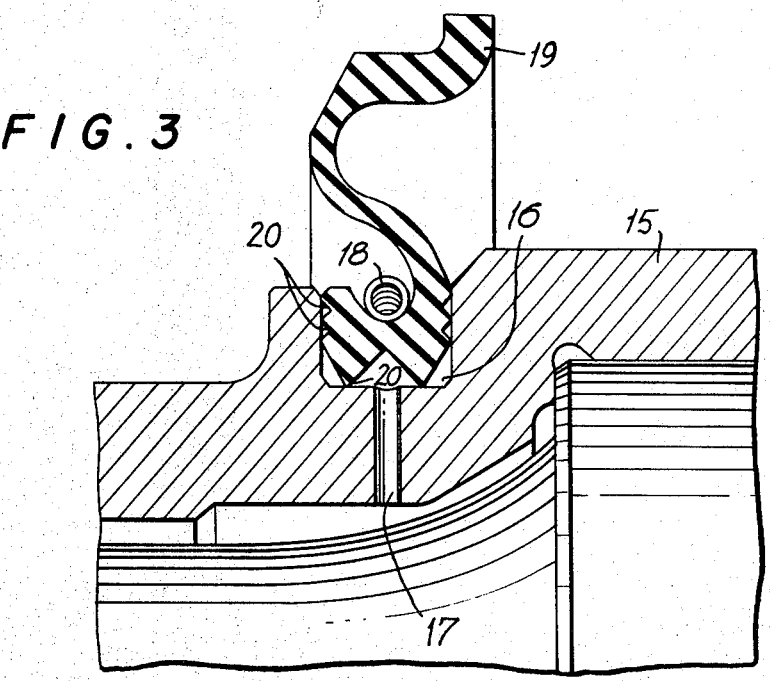
FIG. 3 is a portion of the axle-box sealing from the wheel side, on an increased scale.

From the wheel side the axle-box sealing comprises: a collar 15 (FIG. 1) rigidly set on an axle journal 9 and having a cannelure 16 and an oil-carrying duct 17; a corrugated sleeve 19 spring-loaded by a ring spring 18 (FIG. 3), whose working edges 20 are arranged in the cannelure 16 of the collar 15 forming a labyrinth together with its walls; a rubber ring 21 (FIG. 1) with an elastic ring 22, is also provided on the collar 15 and in the rear cover 5, for protecting the working edges 20 of the corrugated sleeve in the cannelure 16 of the collar 15 against dust and moisture.

Provided in the axle-box body 1 are pockets 23 (FIG. 2) communicating with the tank 2.

The axle-box sealing from the wheel side and the pockets 23 in the body 1 permit an expansion of the active volume of the oil so that the lower portion of the bearing and a portion of the rest bushing are immersed in the oil.

An oil sight glass 24 (FIG. 1) is built in the front cover 4 for inspection of the oil level in the axle-box.

An oiler 25 with a filter inside is also provided on the front cover 4. Said oiler 25 serves to fill the tank 2 of the axle-box with oil and serves as a means for communication between the inner space of the axle-box and the environment, thereby precluding a pressure difference in the axle-box due to temperature fluctuations.

A cushion 26 is provided in the axle-box tank 2, which in case of malfunction of the sealing and excessive loss of oil, precludes early heating of the bearing 3 due to the capillary feed of oil to the surface of the rest bushing 6. If the level of oil in the tank 2 is normal, the cushion 26 does not feed oil and serves as a filter for oil going to the bearing 3.

An inspection cover 27 is provided in the center of the front cover 4 for preventive inspection of the axle-box.

Drainage of oil from the axle-box is effected through a hole closed by a plug 28.

The axle-box functions as follows.

The rotation of the axle 9 of a pair of wheels is accompanied by rotation of the rest bushing 6 whose portion, together with the lower portion of the bearing 3, is immersed in oil available in the tank 2.

Through the hole 10 in the lower portion of the bearing 3, oil is channeled to the gap 12 and therefrom to the friction surfaces between the bearing 3 and the rest bushing 6. The incoming oil raises the bearing 3 and precludes the contact of its working surface with the surface of the rest bushing. Oil is channeled to the butt surfaces of the rest bushing 6 along the arched grooves 13 communicating with the radial grooves 14 leading to the cylindrical surface of the bearing 3.

The rotatable rest bushing 6 carries oil to feed it to the space between the cylindrical and butt surfaces of the bearing 3 and the rest bushing 6. A hydrodynamic pressure develops in the newly formed oil layer, equalling, by value, the load produced externally on the bearing 3. As a result, the contact surfaces of the bearing 3 and the rest bushing are completely disengaged by a continuous lubrication layer, i.e. the conditions of liquid friction become manifest.

The operation of the bearing 3 in the conditions of liquid friction is ensured since a permanent contact of the rest bushing 6 with the lubrication whose working level in the tank 2 is maintained. This is because of a reliable sealing of the axle-box space by means of the sleeve 19 whose working edges are arranged in the cannelure 16 of the collar 15, which precludes a leakage of oil during angular and axial displacement of the system "pair of wheels—axle-box."

The sealing is still more reliable because of the lubrication being brought to the annular gap via the duct 17 in the collar 15, said gap being formed by the working edges 20 of the sleeve 19 and the bottom of the cannelure 16, which creates the effect of a labyrinth, i.e. equalizes the oil pressure from both sides of the sleeve sealing edge. The labyrinth is also created in a vertical direction along the walls of the cannelure 16, as the side working edges 20 (FIG. 3) of the sleeve 19, entering in the cannelure 16, have circular corrugation. Furthermore, the feed of oil to the cannelure 16 along the duct 17 guarantees reliable lubrication of the working edges 20 of the sleeve 19, thus increasing its service life.

In the axle-box for the axle of a pair of wheels of rolling stock made, according to the present invention, the bearing functions in the conditions of liquid friction, which ensures reliable and prolonged operation of the bearing pair, precluding early wear, overheating, as well as backfins or other damage.

The liquid friction bearings damp down impacts and absorb vibration and may operate despite warpage, offering negligible resistance; within the range of speeds practical in railroad transport. They have no limitations with regard to the rotation speed, they are simple in design and comparatively cheap, require minimum servicing and minor expenses on current maintenance. The expediency of their employment, particularly in the case of high speeds of motion, is manifest.

When describing the exemplary embodiment of the present invention concrete narrow terminology has been used for the sake of clarity. However, the invention is not limited by the terms adopted and it should be borne in mind that each of these terms embraces all the equivalent elements working analogously and used to solve similar problems.

Although the present invention has been described with reference to an exemplary embodiment thereof, various alterations and modifications can be made without departing from the spirit and scope of the invention, as those skilled in the art may easily understand.

These alterations and modifications are to be considered as falling within the essence and scope of the invention, as specified in the appended claims.

What we claim is:

1. An axle-box for the axle of a pair of wheels of rolling stock comprising:
   (a) a body;
   (b) a cylindrical friction bearing supported in said body and provided with opposite butt ends;
   (c) a cylindrical axle rotatably journaled in said body;
   (d) a cylindrical rest bushing fixedly mounted concentrically on said axle and provided with opposite end portions arranged internally of said friction bearing for rotation therein;
   (e) a pair of annular thrust rings secured one on each of the opposite butt ends of said friction bearing, each of said thrust rings being provided with an inner periphery radially overlying the opposite end portions of said rest bushing interposed therebetween and axially spaced therefrom;
   (f) an oil tank provided in said body, said cylindrical bearing being provided with an opening disposed transversely of said axle in communication with said oil tank;
   (g) a collar fixedly mounted on said axle to rotate therewith, said collar being axially offset from one end portion of said rest bushing; and
   (h) sealing means mounted in said body and coacting with a cannelure provided in said collar for preventing oil leakage.

2. An axle-box as claimed in claim 1 wherein each thrust ring is provided with an arched groove and a radial groove communicating with one another, the depth of the arched groove being largest at the point of communication with the radial groove and the smallest at the ends of said arched groove.

3. An axle-box as claimed in claim 1, wherein the sealing means includes a corrugated sleeve mounted in said body and provided with working edges arranged in said cannelure provided in the collar forming a labyrinth, said cannelure being provided with a duct for channeling oil to the working edges of the sleeve.

References Cited
UNITED STATES PATENTS

| | | | |
|---|---|---|---|
| 1,657,881 | 1/1928 | Crawford | 308—79 |
| 2,118,138 | 5/1938 | Bary | 308—85 |
| 2,254,183 | 8/1941 | Maier | 308—187 X |
| 2,404,429 | 7/1946 | Brittain | 308—85 |
| 2,648,576 | 8/1953 | Horger | 308—187 X |
| 2,977,138 | 3/1961 | Brittain | 277—29 |
| 3,211,501 | 10/1965 | Clark | 308—83 |

FOREIGN PATENTS

| | | |
|---|---|---|
| 563,803 | 2/1953 | Canada. |
| 648,581 | 7/1937 | Germany. |

MANUEL A. ANTONAKAS, Primary Examiner

U.S. Cl. X.R.

308—187